Dec. 21, 1926.
W. H. O'DELL
1,611,772
CIRCUIT BREAKER
Filed Oct. 29, 1924
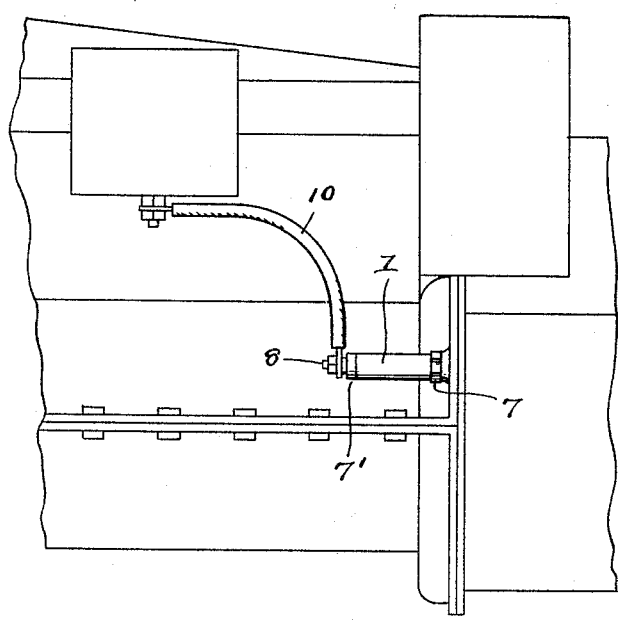
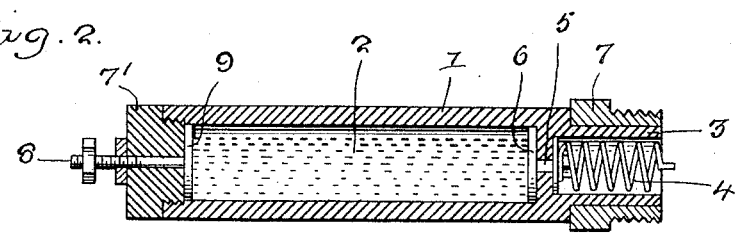
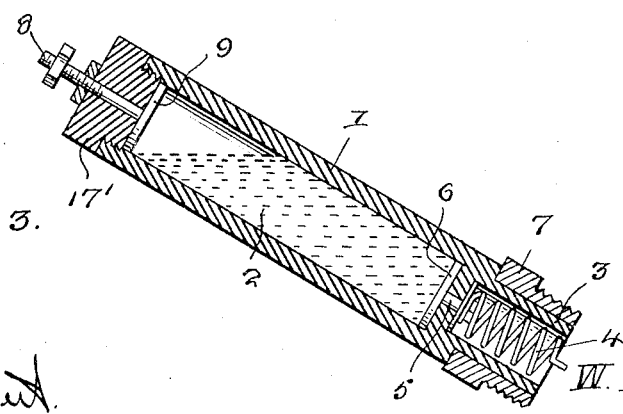
W. H. O'Dell
INVENTOR
BY Victor J. Evans
ATTORNEY Patented Dec. 21, 1926.

1,611,772

UNITED STATES PATENT OFFICE.

WILLIAM H. O'DELL, OF WHITMIRE, SOUTH CAROLINA.

CIRCUIT BREAKER.

Application filed October 29, 1924. Serial No. 746,612.

This invention relates to a circuit breaker for the Fordson type of tractor, the general object of the invention being to provide automatic means for breaking the ignition circuit if the tractor should rear up and thus prevent the tractor from falling over upon the operator.

Another object of the invention is to so form the device that it can be quickly put in place upon the tractor and without changing any parts of the tractor.

A further object of the invention is to provide means whereby the mercury in the device can be increased or diminished to make the device active at the desired inclination.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of a tractor showing the invention in use.

Figure 2 is a longitudinal sectional view through the device.

Figure 3 is a similar view but showing the device in an inclined position and showing how the mercury leaves the outer contact to break the circuit.

As shown in these views, the device consists of a cylinder 1 which is formed of fibre or other non-conducting material and is adapted to contain a body of mercury, such as shown at 2. One end of the cylinder is provided with a socket 3 to receive a coil spring 4 which is held in place by a stud 5 which passes through the portion of the cylinder between the socket and the bore of the cylinder and is attached to a washer 6 which is located in the bore. Thus the spring is electrically connected with the mercury. A nut 7 is carried by the inner end of the cylinder and the outer end of the cylinder is closed by a threaded plug 7' which carries a contact post 8 to the inner end of which is connected a washer 9 which is adapted to engage the mercury in the cylinder. The nut 7 is screwed into the hole provided for the magneto post, this post being removed, and the end of the spring 4 will engage the contact in the magneto. Then the conductor 10 leading from the coil box of the magneto is fastened to the post 8. Thus the current will flow from the magneto through the coil 4, stud 5, washer 6 through the mercury to the washer 9 and through the post 8 to the conductor 10. If the tractor should rear up the device would assume a position, as shown in Figure 3, so that the mercury would not touch the washer 9 and thus the circuit would be broken so that the tractor would drop back to a horizontal position again and not fall over upon the operator. Then the circuit would be automatically completed again. By removing the plug 7' and either replenishing the mercury or removing some of the same the degree of inclination at which the circuit will be broken can be adjusted.

This device will prevent injury to the operator and damage to the tractor and the implement drawn thereby by preventing the tractor from rearing up under a great strain on the draw bar thereof as it will break the ignition circuit when the tractor moves upwardly to a certain angle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A circuit breaker, comprising a cylinder of non-conducting material having one end reduced and provided with a socket, the other end being open and having internal screw threads, a threaded plug fitting in the open end, a post passing through the plug, a washer connected with the inner end of the post and covering the inner end of the plug, a stud passing through the other end of the cylinder and extending into the socket, a washer connected with the stud and arranged within the cylinder, mercury in the cylinder for contacting with the washers, a spring in the socket engaging the stud and a nut member on the reduced end of the cylinder.

In testimony whereof I affix my signature.

WILLIAM H. O'DELL.